United States Patent
Dror et al.

(10) Patent No.: US 9,299,081 B2
(45) Date of Patent: Mar. 29, 2016

(54) DERIVING A USER PROFILE FROM QUESTIONS

(75) Inventors: Gideon Dror, Tel Aviv (IL); Yoelle Maarek, Haifa (IL); Dan Pelleg, Haifa (IL); Idan Szpektor, Kfar Saba (IL)

(73) Assignee: YAHOO! INC., Sunnyvale, CA (US)

(*) Notice: Subject to any disclaimer, the term of this patent is extended or adjusted under 35 U.S.C. 154(b) by 102 days.

(21) Appl. No.: 13/608,149

(22) Filed: Sep. 10, 2012

(65) Prior Publication Data

US 2014/0075334 A1   Mar. 13, 2014

(51) Int. Cl.
*G06Q 30/02* (2012.01)
*G06F 17/30* (2006.01)

(52) U.S. Cl.
CPC .......... *G06Q 30/02* (2013.01); *G06F 17/30702* (2013.01); *G06F 17/30035* (2013.01); *G06F 17/30766* (2013.01)

(58) Field of Classification Search
None
See application file for complete search history.

(56) References Cited

U.S. PATENT DOCUMENTS

| 6,418,440 | B1* | 7/2002 | Kuo et al. | |
| 7,966,282 | B2* | 6/2011 | Pinckney et al. | 706/62 |
| 2001/0049688 | A1* | 12/2001 | Fratkina et al. | 707/104.1 |
| 2004/0141003 | A1* | 7/2004 | Nivers et al. | 345/745 |
| 2005/0143067 | A1* | 6/2005 | Van Do et al. | 455/432.3 |
| 2009/0183179 | A1* | 7/2009 | Keith et al. | 719/318 |
| 2012/0047143 | A1* | 2/2012 | Petersen et al. | 707/738 |
| 2012/0066607 | A1* | 3/2012 | Song et al. | 715/737 |
| 2012/0166457 | A1* | 6/2012 | Ross et al. | 707/755 |

* cited by examiner

*Primary Examiner* — Matt Kim
*Assistant Examiner* — Daniel Samwel
(74) *Attorney, Agent, or Firm* — Cooper Legal Group, LLC

(57) ABSTRACT

A system and method for learning a new user's interests in the absence of historical data includes: generating a user interface on which a user interacts in a session; formulating questions such that a user response to the questions indicates a preference; presenting the questions to the user on the user interface; receiving responses from the user, the responses indicating user preferences; and populating a new user profile with the user preferences. The steps of presenting, receiving, and populating are repeated until the session terminates.

18 Claims, 15 Drawing Sheets

*FIG. 6*

Hello, George

Liverpool v Man City who will win?
Expand...

What teams do you think England play?
Expand...

Need help stopping on ice (?
Expand...

Recommended questions for the user

Get another set of recommended questions

Your chosen questions - to explore later

Should I play hockey for my high school if I haven't touched a stick or skated in 5 years?
Expand...

Between Chelsea, Man United, Arsenal, Liverpool and Man City - who will spend the most this summer?
Expand...

Why is everyone saying that germany is going to win the world cup?
Expand...

*FIG. 8*

Liverpool v Man City who will win ?
Expand

What teams do you think England play?
Collapse
With this squad what teams do you think England could beat out of the ones selected? I know people say it depends who they have or on the day but at a guess.. And what subs would you use of those selected.. Hart G.Johnson J.Terry M.Dawson A.cole T.Walcott S.Gerrard S.Parker J.Millner D.Bent A.Carrol The subs would be: A.young J.Defoe A.Johnson F.Lampard L.biens P.Jagileka B.Foster So here are the teams: Italy Germany Spain France Argentina Brazil Holland Uruguay Portugal Greece Mexico Answers:

* None of them while we still have that excuse for a manager who doesn't understand how the players play for their clubs.

* maybe mexico and greece but we will get battered by the rest also rooney for carroll baines for cole young for milner defoe for bent

* italy,mexico,uruguay,greece,france and portugal. wayne rooney for andy carol jack wilsere for parker Need help stopping on ice :(?
Expand...

Get another set of recommended questions

DERIVING A USER PROFILE FROM QUESTIONS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of on-line networking sites, and more particularly relates to the field of learning tools for on-line networking sites.

BACKGROUND OF THE INVENTION

In a community question-answering (CQA) network such as Yahoo!Answers, it is desirable to present users with questions that match their interests in order to foster a better community experience. Many users, however, are reluctant to answer formal questionnaires that indicate their preferences. Modern systems resort to automatically inferring user preferences from the user's historical interaction with the system. Unfortunately, these methods are not applicable to new users, with no history within the system. Yet it is critical to retain the new users while they visit the CQA network for the first time because they represent a great opportunity for new traffic.

Therefore there is a need for a learning method that overcomes the above-stated shortcomings of the known art.

SUMMARY OF THE INVENTION

Briefly, according to an embodiment of the invention a cold start method for generating a user profile includes steps or acts of: generating a user interface on which a user interacts in a session; formulating questions such that a user response to the questions indicates a preference; presenting the questions to the user on the user interface; receiving responses from the user, the responses indicating user preferences; and populating a user profile with the user preferences. The steps of presenting, receiving, and populating are repeated until the session terminates.

According to another embodiment of the present invention, a computer program product includes a computer-readable storage medium with computer-executable instructions stored therein. The computer-executable instructions, when executed by a processor device, cause a computer to perform the method steps for deriving a user profile as discussed above.

According to another embodiment of the present invention, an information processing system for deriving a user profile includes: a memory with computer-executable instructions stored therein, and a processor device operably coupled with the memory. The computer-executable instructions, when executed by the processor device, cause a computer to perform the method steps as discussed above.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 3 through FIG. 13 are exemplary screenshots showing how the method proceeds, according to an embodiment of the present invention;

Figure 1:
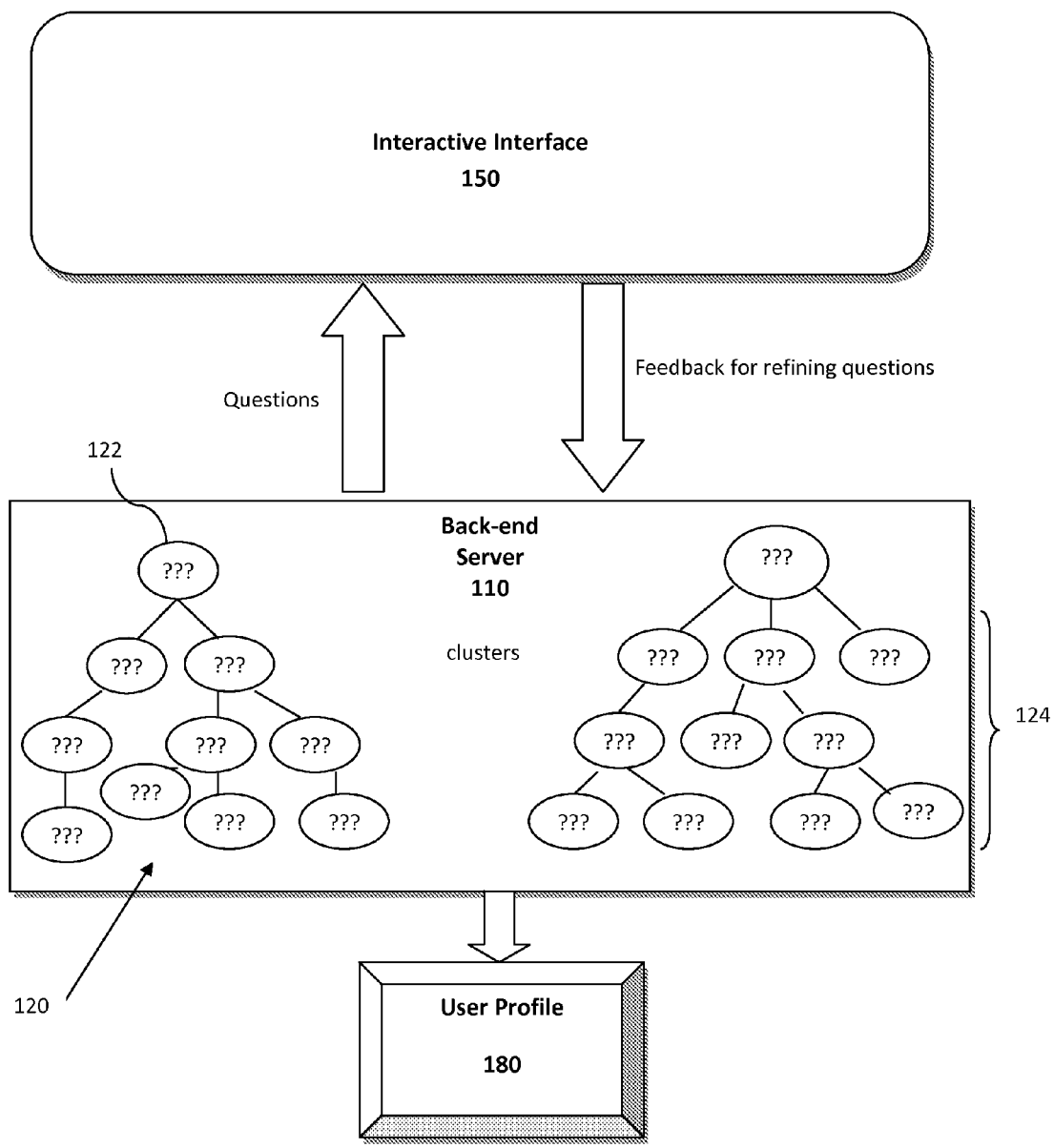
FIG. 1 is a simplified block diagram showing an information processing system configured to operate according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a method for learning new users' interests in the absence of historical data. The method can be advantageously applied to CQA networks and any other situations where it is desirable to know user preferences, such as advertising. What we propose is a novel adaptation of the "cold-start" approach in order to quickly find a user's interests through relevant questions even in the absence of any personal historical data. The method is interactive, and proceeds by presenting representative questions and their related tags to the user. The user/respondents can signal for each question whether they would like to see more like it in the future, whether they would like to never see similar questions, or whether they are neutral. At the end of the process, a compact profile of the user has been generated. The profile is stored for future use, such as to screen new questions for the user.

We provide an interface for learning about users with no prior history in the system via a playful, automatically generated questionnaire derived from representative items. The questionnaire, derived from a hierarchy of topics, allows us to infer representative items in a sparse space where there are no exemplar items with high coverage. It is a hybrid method that takes advantage of areas where a taxonomy exists (such as sports), and is able to further break down a category into latent sub-categories (such as in politics). It has the advantage of eliminating the need for a "warm-up period" where the user is watched interacting with an un-tuned system. In addition, the interface presents a catchy and entertaining game to attract new users.

The novelty in our approach lies in:

(1) identifying relevant representative questions which turn out to be significantly more challenging than in other domains like movies due to the size and sparseness of the domain (questions in general purpose CQA networks can relate to "any" topic). This is because in the movie domain, most users have an opinion and are not reluctant to express their opinion; and (2) generating a playful interactive dialog with the system, which allows us to turn an information gathering task into a game-style experience.

Referring now in detail to the drawings, and in to FIG. 1 in particular, we show a simplified depiction of a system in which the method can be implemented, according to an embodiment of the present invention. The solution consists of two main components: (1) a back-end server 110; and (2) an interactive component 150 that establishes a dialog with the user.

The back-end server 110 pre-processes the historical questions and answers on the site offline, and creates representative clusters of questions 120, one for each respective topic of interest. Each cluster 120 is associated with one or more representative questions that most closely match the cluster (in some unspecified similarity measure). For each cluster 120 we also extract the most indicative terms as relevant tags for the representative questions. The clusters 120 are grouped with a main cluster 122 representing a main topic, such as "Sports." Within the main cluster 122 are sub-clusters 124 that are associated with the main topic. Each sub-cluster 124 may itself have sub-clusters in a hierarchy. With the clusters 120 arranged in this manner, it is easier to drill-down in a depth-first traversal of the hierarchy to zero in on a user's interests. Once the server 110 receives an indication that the "game" is over, the server 110 generates a user profile 180 from the responses.

In another embodiment, the server 110 propagates a user profile 180 with the input from the user as the questioning proceeds rather than generating the profile 180 when the questionnaire is completed. In this manner, an at least partial user profile 180 is generated even if the user does not answer all of the questions to completion.

Figure 2:
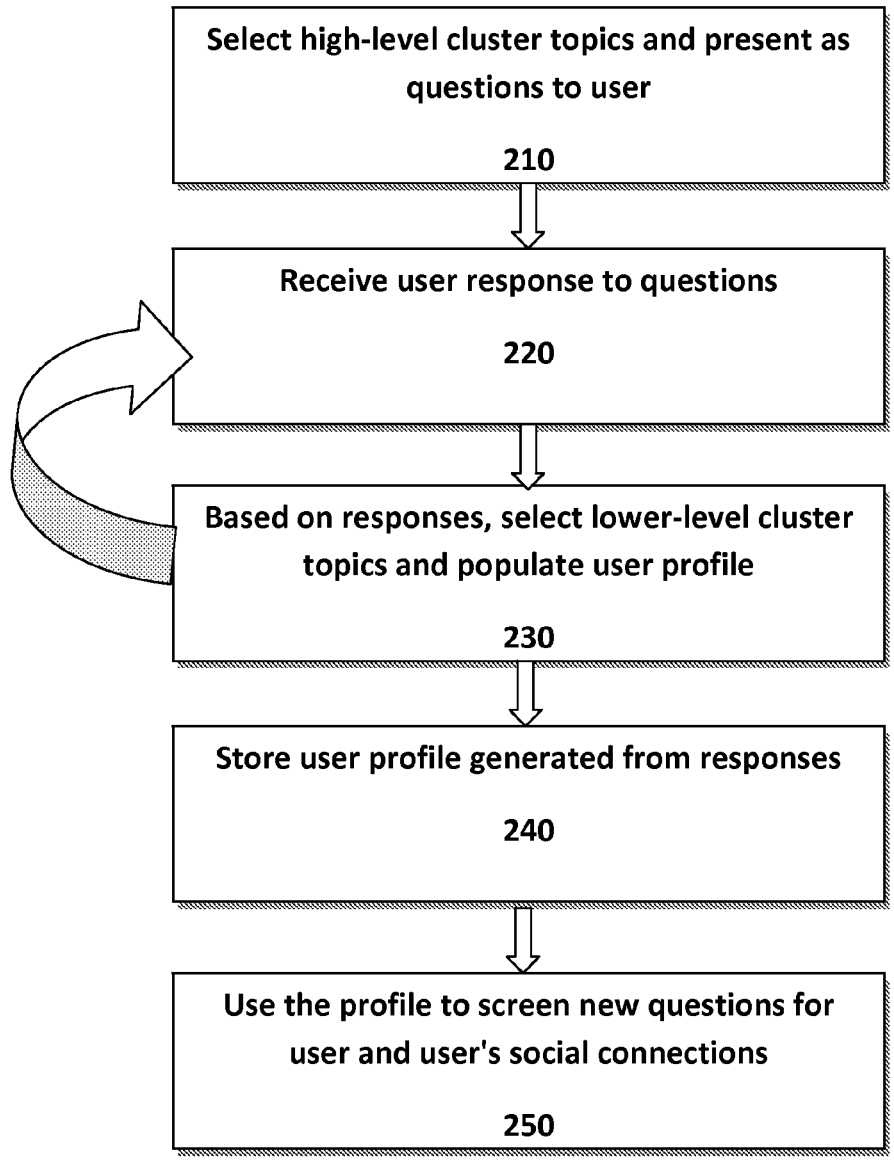
FIG. 2 is a high-level flowchart of a method for cold start learning, according to an embodiment of the present invention.

Referring now to FIG. 2, we show a flowchart 200 of the cold start learning method, according to an embodiment of the present invention. In step 210 the cold start learning interface 150 presents to a user a list of representative "interesting" questions from different main topic clusters 122. These questions are purposefully selected to guide the server 110 in narrowing down the user's interests; therefore the questions begin at a general level and then become more fine-grained as the user proceeds.

In step 220 the user's response is received at the interface 150 and transmitted to the server 110. The response at this early stage will likely be a simple like/don't like/neutral vote for each of questions selected from different clusters 120. The user responses prompt the back-end server 110 to zero in on the cluster(s) 120 of interest to the user. A negative response by a user will trigger inhibition of a particular cluster 120 for that user session.

In step 230, based on the responses received, the back-end server 110 selects topics from a narrowed-down subset 124 of clusters 120 and these cluster topics 124 are presented as questions on the interface 150. Behind the scene, the responses of the user are linked to selecting future questions from the clusters 124. The point of this exercise is to generate a user profile 180. Some playful aspects of the game include limited response time for voting and the ability to give feedback on the "class of answerers" the user belongs to at the end of the game. Steps 220 and 230 are iterative and proceed until the end of the "game," or until the user terminates the game. At the same time, the server 110 is populating a user profile 180 with user preferences inferred from the responses. Naturally, the more iterations, the finer grained the user profile 180 becomes. Each iteration provides more depth to the user profile 180.

Once the end point is reached, in step 240 the server 110 stores the user profile 180. This profile 180 allows the back-end system 110 to compute the personalized recommended questions to the user. Additionally, the profile 180 can be used to recommend questions to the user's social connections within a social network by showing each user content suited for his/her profile.

Screenshots.

FIGS. 3 through 13 show screenshots of the Interactive Interface 150, detailing the user interaction that enables the generation of the user profile 180 and the profile-derived questions.

Figure 3:
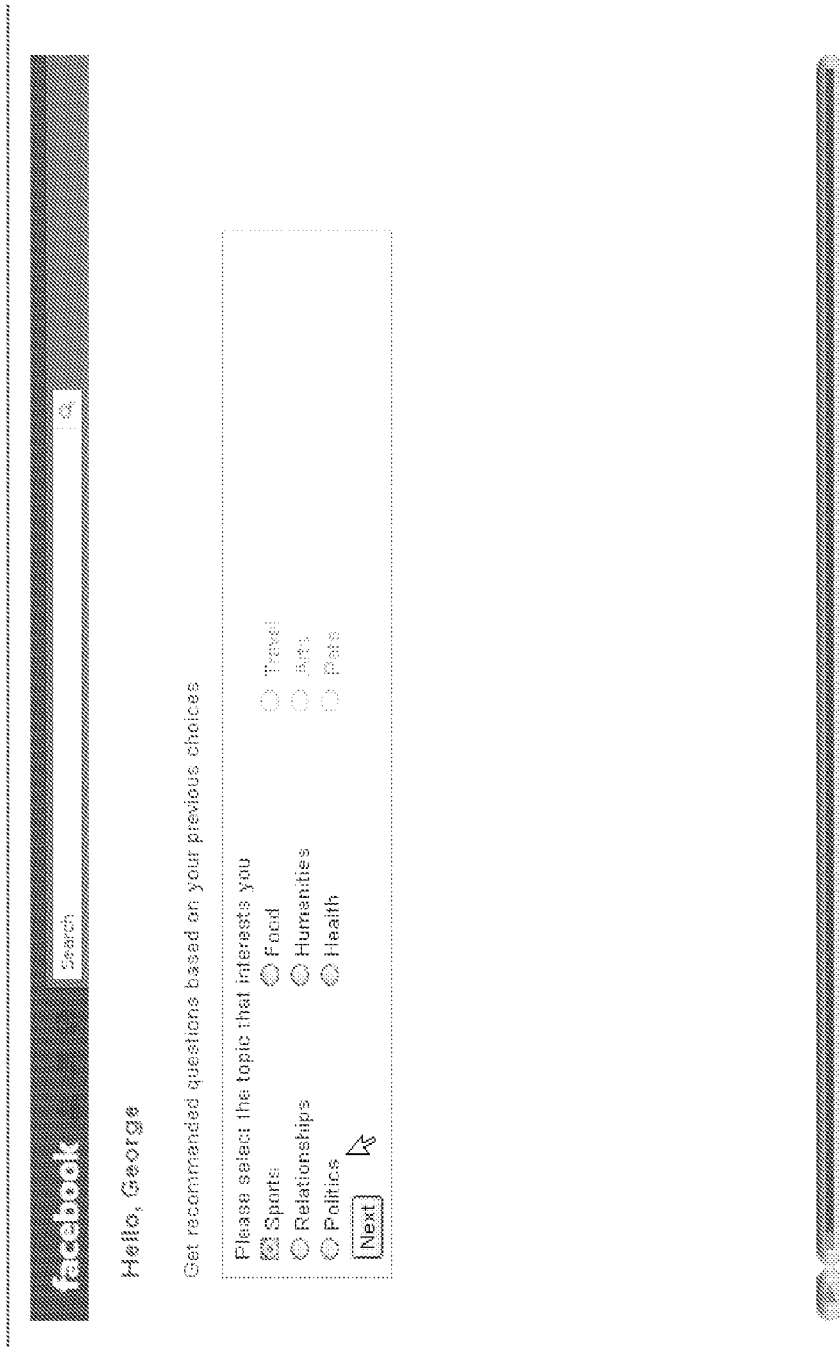
Figure 4:
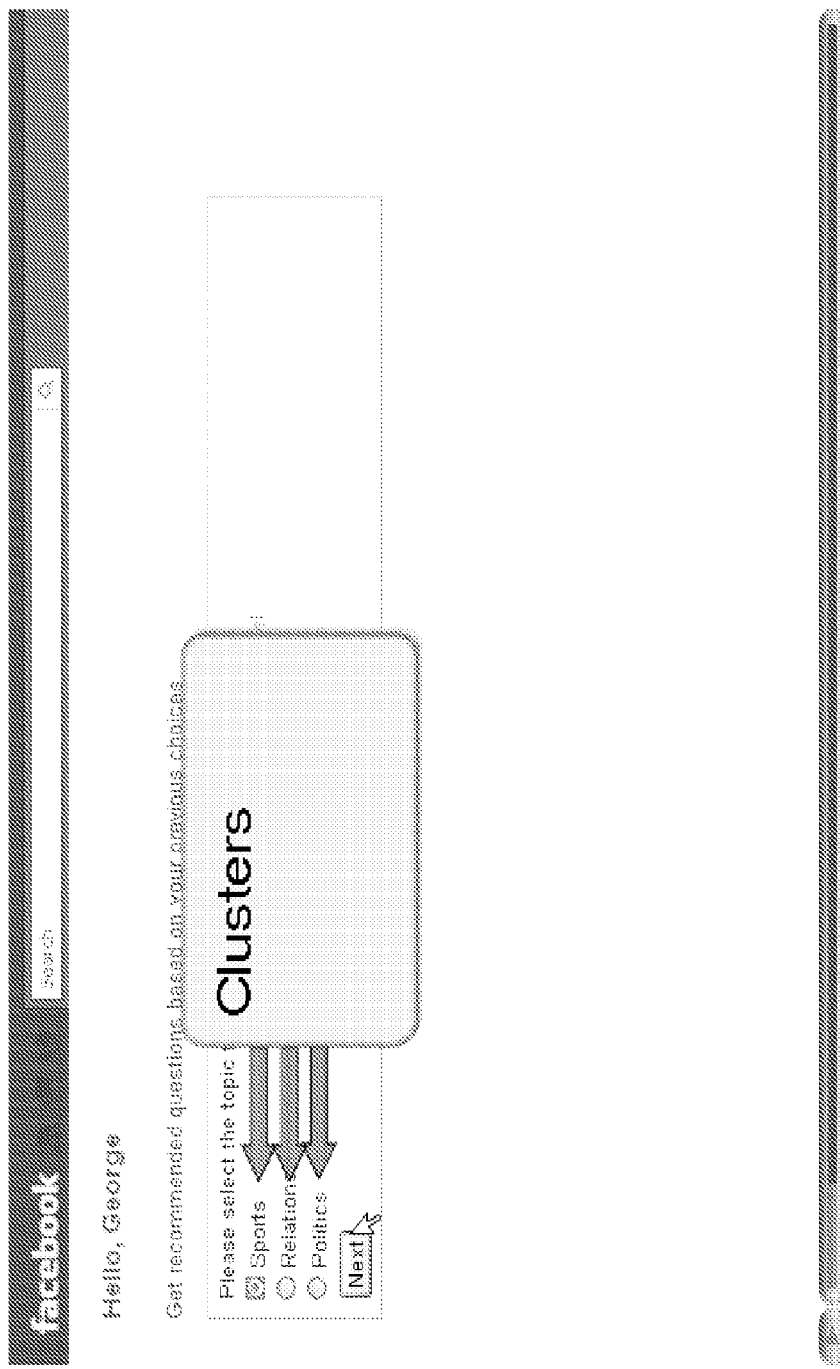

FIG. 3 is a screenshot of the Interactive Interface 150 showing a preliminary question directed at discovering a high-level topic of interest for the user. Each of the selections shown here represents a "topic cluster." FIG. 4 shows that each of the preliminary high-level questions relates to a topic.

Figure 5:
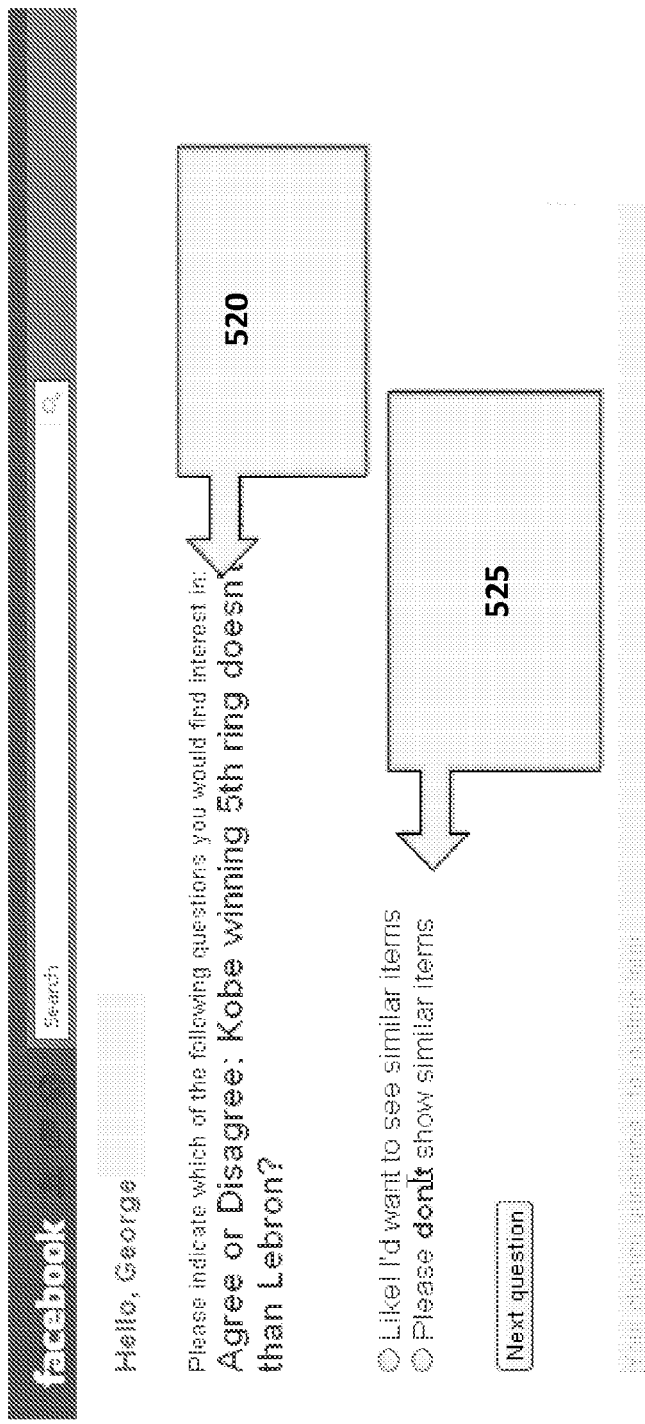

Referring now to FIG. 5 we show a screenshot of the Interactive Interface 150 after the main topic (Sports) has been selected. Now the method proceeds by asking exemplar questions 520 related to the main topic and noting the user's preferential responses to questions related to sub-topics (sub-clusters) of the main topic cluster (Sports). The exemplar questions 520 will continue probing the user's interests, as inferred by the answers 525 to the exemplar questions 520. The user indicates his/her preference by selecting an available response to a question.

Figure 6:
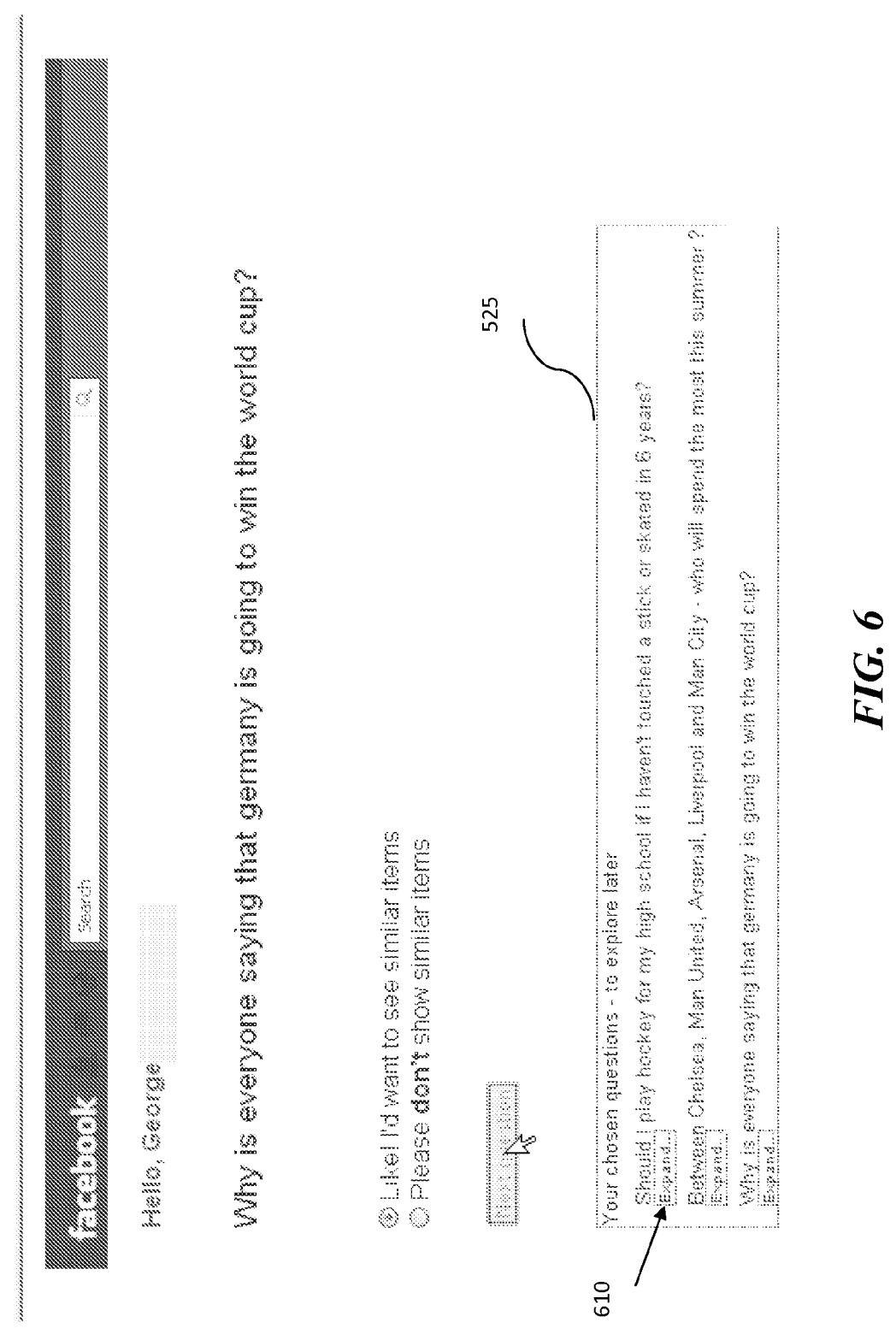

In these examples, the available responses are in the form of: a) I wish to see items similar to this sub-topic; or b) I do not wish to see items similar to this sub-topic. It should be noted that other response selections can be implemented within the spirit and scope of the invention. For example, rather than a selection between like/dislike as in these examples, the user can choose between thumps up/thumps down; Yes/No; More/Pass; Agree/Disagree, and the like. Any types of answers 525 to exemplar questions are considered provided that the answers 525 eliminate and/or affirm a sub-topic of interest to the user. Multiple exemplar questions 520 are provided to the user to derive a good understanding of the user's preferences. In FIG. 6 we see that the positive responses 525 in which the user has indicated an interest are accumulated and shown to the user. The user is able to expand 610 the sub-topic to learn more about it.

Figure 7:
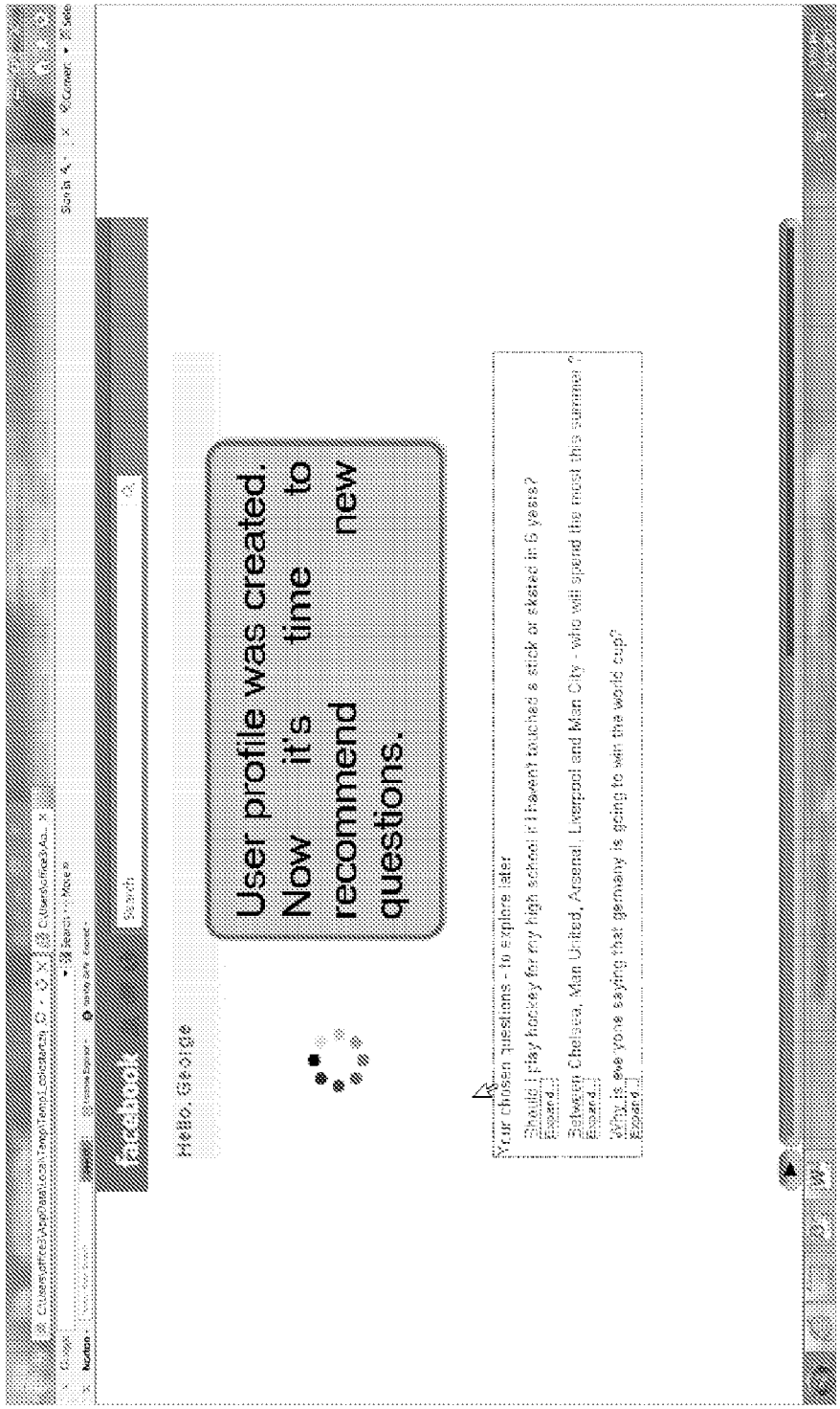

FIG. 7 is a screenshot showing that the User Profile 180 is being generated from the responses 525. FIG. 8 shows the Interface 150 with the set of recommended questions for the user based on the User Profile 180 generated. FIG. 9 shows the expansion after the user has selected the Expand button 610. The Expand button 610 provides in-depth information about the selected sub-topic.

Figure 10:
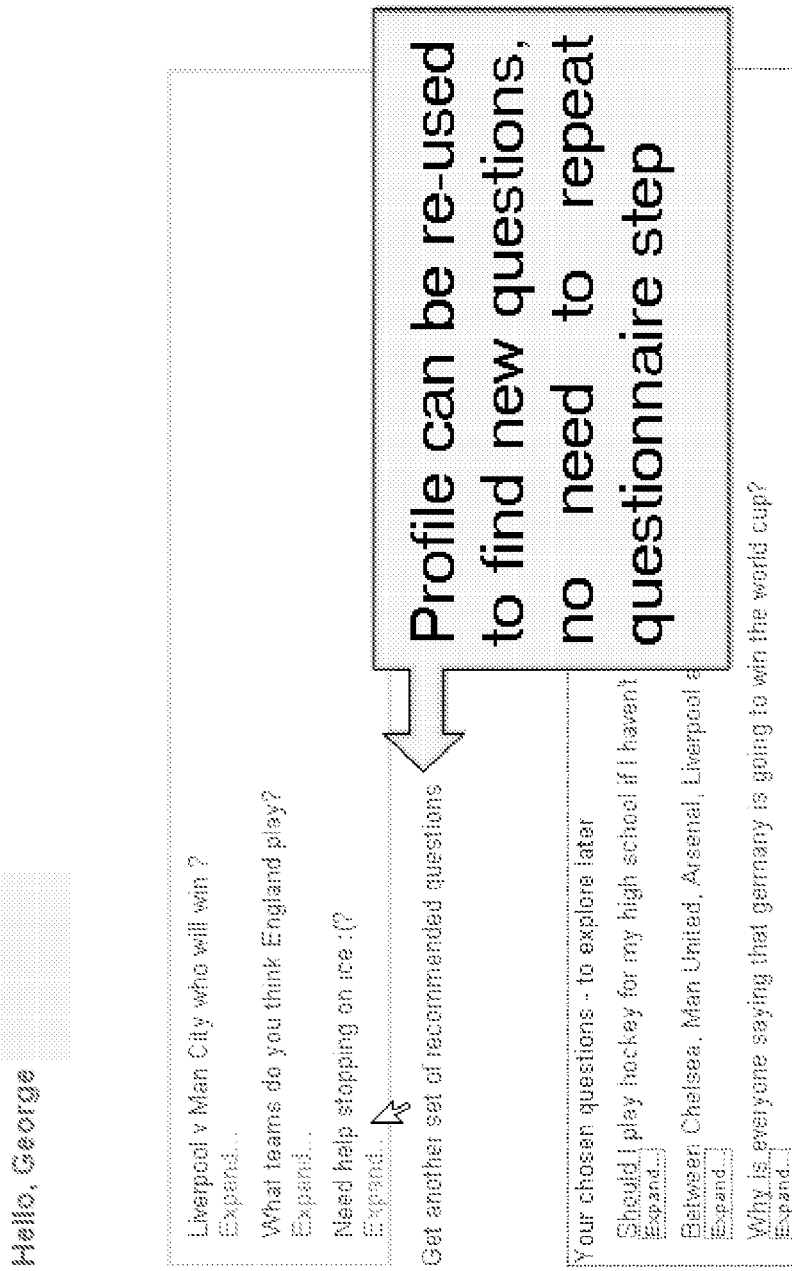
Figure 11:
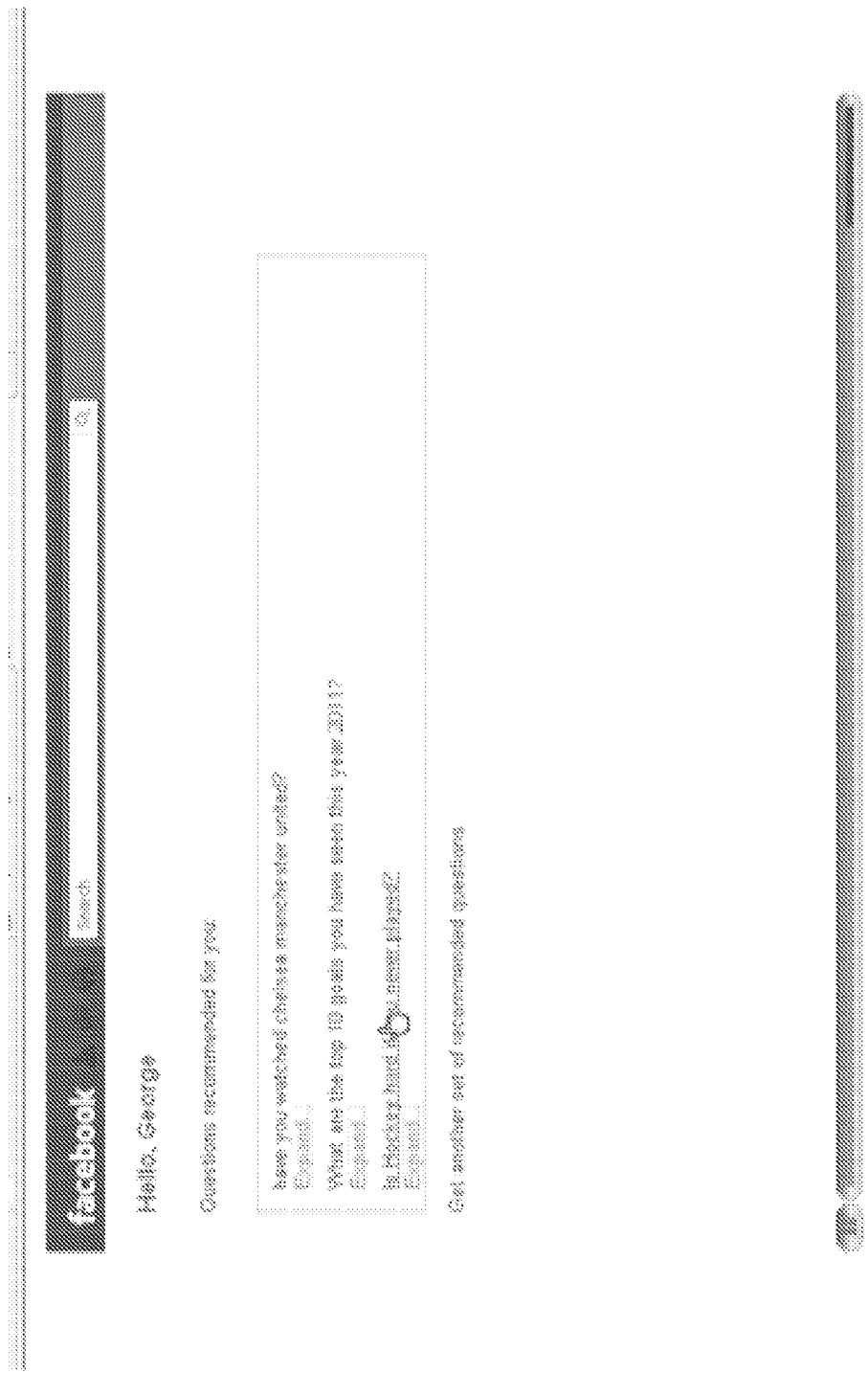
Figure 12:
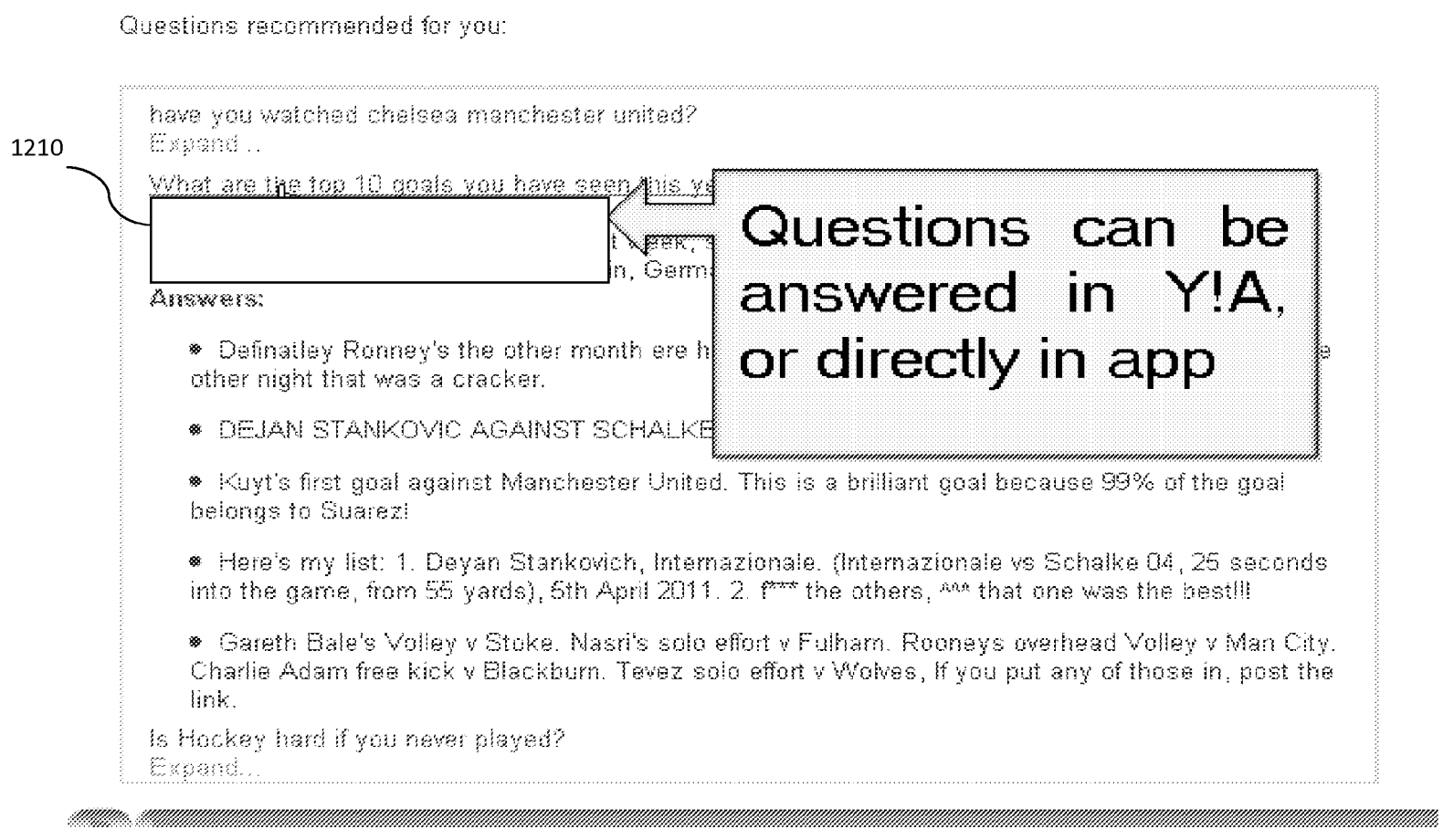

FIG. 10 is a screenshot of the Interface 150 indicating how the User Profile 180 can be used to generate an entirely new set of questions 520 without having to repeat the previous questionnaire steps. FIG. 11 shows another set of questions 520 selected from the same User Profile 180. FIG. 12 shows that the questions 520 can be answered in a CQA forum or directly into an input box 1210.

FIG. 13 shows the question 520 as posted on a social interaction forum, such as Yahoo! Answers.

User Profile.

Figures 14, 15:
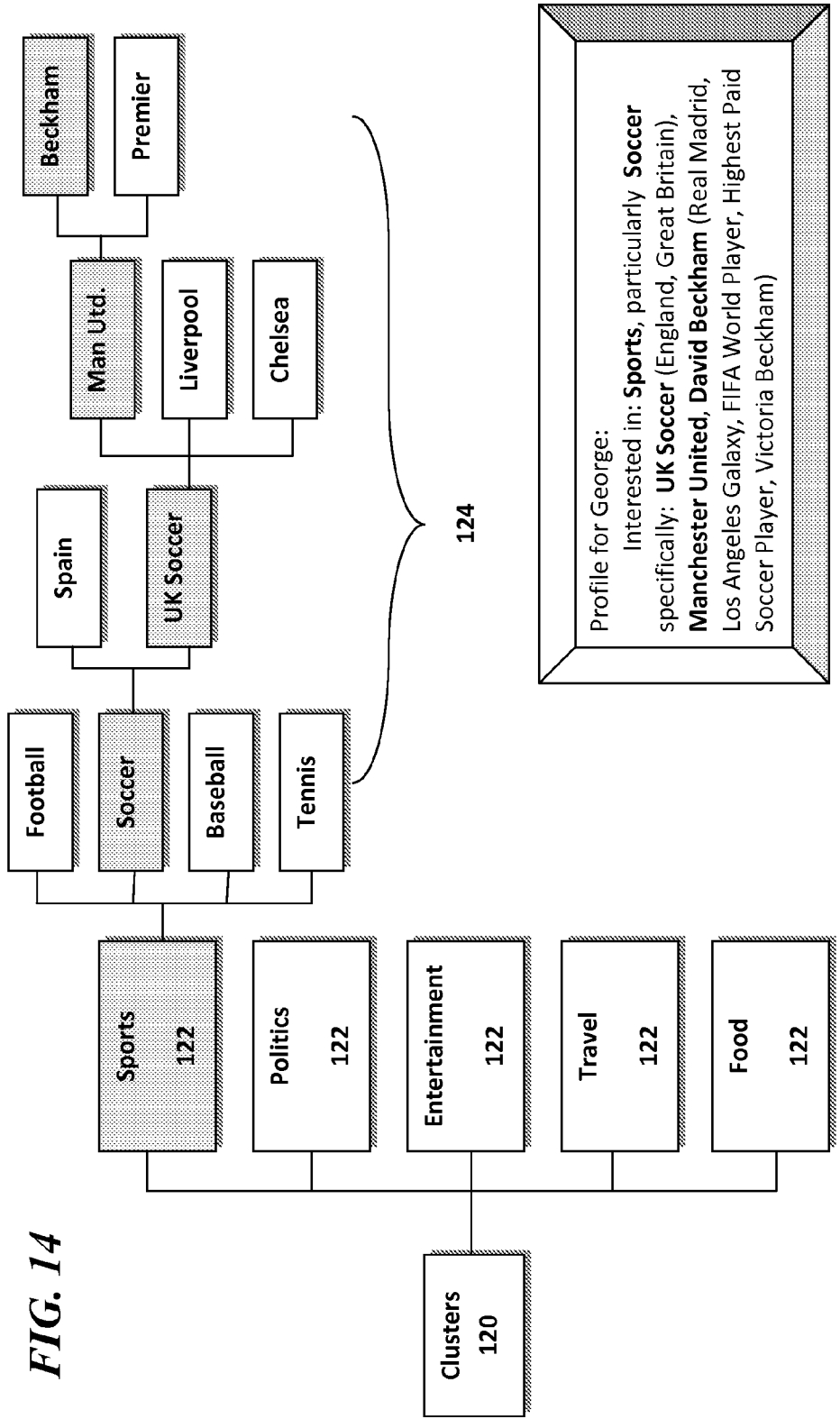
FIG. 14 shows a graph of clusters according to an embodiment of the present invention.
FIG. 15 shows an exemplary user profile generated according to an embodiment of the present invention.

FIG. 14 shows a representative sampling of clusters 120. The main topic cluster 122 and the sub-clusters 124 that are grayed in representative the user selections. Looking at the graph of FIG. 14 we see that our user "George" is interested in Soccer, particularly soccer in Great Britain. The user is further interested in the team Manchester United and has probably followed the career of David Beckham, a former Manchester United soccer player.

By following the user's responses 525, we can generate a user profile 180 for "George" as shown in FIG. 15. We show the cluster topics in bold. You will notice that in addition to the cluster topics to which "George" indicated a positive response, we also include associated keywords that map to the sub-cluster topics. For example, the sub-cluster 124 "David Beckham" has associated with it keywords such as "Real Madrid," "Los Angeles Galaxy," and the like. These keywords are included in the profile to prompt additional questions. The keywords are mapped to cluster topics 124 that may be in other cluster groups. For example, the keyword "Real Madrid" is part of the sub-cluster for the non-elected topic "Spain Soccer." Likewise, the keyword "Victoria Beckham" is part of the non-elected main topic "Entertainment." Even though those lines of questions were eliminated in the user questionnaire, their associated topics are always available. A simple keyword look-up table can be used to retrieve the questions associated with the keywords.

In addition to incorporating explicit input as in the game above, the cold start method may also be used implicitly. This can be done by taking the first question the user chose to answer (or some number K of first answers), and using those responses to seed the choice of clusters. Alternatively, the cold start method may operate on a query a potential user submits to a search engine, by mapping it to a cluster. That user may then be exposed to a CQA site after posting the query, but is not necessarily someone who previously participated in a CQA site, that eventually lead to a hit into the CQA site, and similarly map it to a cluster.

The game can either be played within the CQA site, or in some external site where it is packaged as a fun game. Once completed, the results of the game can be used in the CQA site as described above, and also posted in the context of the external site to encourage other users (possibly the player's neighbors in that site's social network) to participate.

Hardware Embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Figure 16:
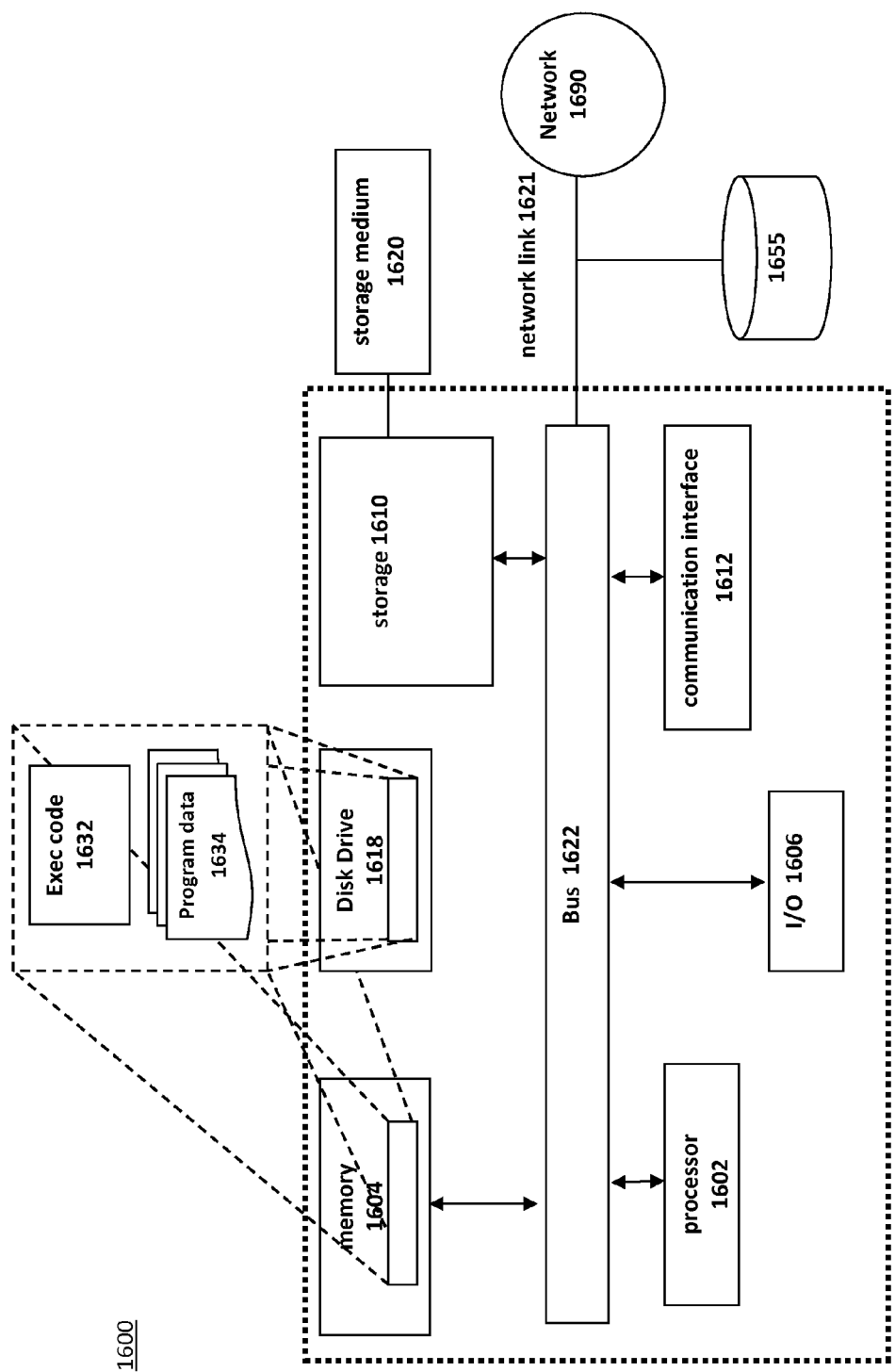
FIG. 16 shows a high-level block diagram of the hardware required to implement the method according to an embodiment of the present invention.

Referring now in specific detail to FIG. 16, there is provided a simplified high-level block diagram of an information processing system 1600 for generating a user profile in which the present invention may be implemented. For purposes of this invention, computer system 1600 may represent any type of computer, information processing system or other programmable electronic device, including a client computer, a server computer, a portable computer, an embedded controller, a personal digital assistant, and so on. The computer system 1600 may be a stand-alone device or networked into a larger system. Computer system 1600, illustrated for exemplary purposes as a networked computing device, is in communication with other networked computing devices (not shown) via network 1690. As will be appreciated by those of ordinary skill in the art, network 1690 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 1600, for simplicity. As will be appreciated by those of ordinary skill in the art, aspects of the invention may be distributed among one or more networked computing devices which interact with computer system 1600 via one or more data networks such as, for example, network 1690. However, for ease of understanding, aspects of the invention have been described as embodied in a single computing device—computer system 1600.

Computer system 1600 includes processing device 1602 which communicates with an input/output subsystem 1606, memory 1604, storage 1610 and network 1690. The processor device 1602 is operably coupled with a communication infrastructure 1622 (e.g., a communications bus, cross-over bar, or network). The processor device 1602 may be a general or special purpose microprocessor operating under control of computer program instructions 1632 executed from memory 1604 on program data 1634. The processor 1602 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 1604 may be partitioned or otherwise mapped to reflect the boundaries of the various memory subcomponents. Memory 1604 may include both volatile and persistent memory for the storage of: operational instructions 1632 for execution by processor device 1602, data registers, application storage and the like. Memory 1604 preferably includes a combination of random access memory (RAM), read only memory (ROM) and persistent memory such as that provided by a hard disk drive 1618. The computer instructions/applications that are stored in memory 1604 are executed by processor 1602. The computer instructions/applications 1632 and program data 1634 can also be stored in hard disk drive 1618 for execution by processor device 1002. Database 1655 pictured here is a representation of storage for the questions, profiles, and keywords and may be a plurality of databases operably coupled with a server network 1690 such as the Internet through network link 1621.

Those skilled in the art will appreciate that the functionality implemented within the blocks illustrated in the diagram may be implemented as separate components or the functionality of several or all of the blocks may be implemented within a single component. The I/O subsystem 1606 may comprise various end user interfaces such as a display, a keyboard, and a mouse. The I/O subsystem 1606 may further comprise a connection to a network 1690 such as a local-area network (LAN) or wide-area network (WAN) such as the Internet.

The computer system 1600 may also include storage 1610, representing a magnetic tape drive, an optical disk drive, a CD-ROM drive, DVD-ROM, Cloud Storage, and the like. The storage drive 1610, which can be removable, reads from and/or writes to a removable storage unit 1620 in a manner well known to those having ordinary skill in the art. Removable storage unit 1620, represents a floppy disk, a compact disc, magnetic tape, optical disk, CD-ROM, DVD-ROM, etc. which is read by and written to by removable storage drive 1610. As will be appreciated, the removable storage unit 1620 includes a non-transitory computer readable medium having stored therein computer software and/or data for implementing the real-time feedback collection system.

The computer system 1600 may also include a communications interface 1012. Communications interface 1612 allows software and data to be transferred between the computer system and external devices. Examples of communications interface 1612 may include a modem, a network interface (such as an Ethernet card), a communications port, a PCMCIA slot and card, etc. Software and data transferred via communications interface 1612 are in the form of signals which may be, for example, electronic, electromagnetic, optical, or other signals capable of being received by communications interface 1612.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for deriving a user profile, comprising:
    using a processor device, performing steps of:
        generating a user interface on which a user, for whom no profile exists, interacts in a session;
        formulating questions such that a user response to the questions indicates likes and dislikes of the user;
        initially presenting the questions representing topics from different high-level categories to the user on the user interface;
        receiving responses from the user, the responses indicating user interest from among the different high-level categories;
        iteratively performing the following for each high-level category in which the user expressed an interest:
            selecting a next level of cluster of questions from an increasingly narrowed-down subset of clusters, when one or more responses to questions from a previous level of cluster indicates user interest;
            wherein all questions in a cluster pertain to a same topic;
            presenting questions from the selected next level of cluster;
            receiving user responses to the questions; and
            deriving user preferences from the user responses;
        wherein the iterative acts are performed repeatedly until termination of the session;
        inhibiting at least one cluster, including one or more sub-clusters within the at least one cluster, from consideration for the session when the user indicates no interest in at least one topic associated with the at least one cluster; and
        generating a user profile with the derived user preferences, the user profile including a keyword mapped to a topic that is associated with a first sub-cluster and that the user did not indicate interest in based upon the keyword mapping to a second topic that is associated with a second sub-cluster and that the user did indicate interest in.

2. The method of claim 1 further comprising:
    assigning clusters of questions representing a plurality of topics.

3. The method of claim 2 wherein formulating questions for each cluster comprises: grouping the questions into hierarchical sub-clusters within each cluster, wherein each subsequent level of sub-cluster represents a finer level of granularity in the questions for that sub-cluster.

4. The method of claim 1 wherein no interest is indicated by a negative response or a neutral response from the user.

5. The method of claim 1 further comprising: storing the user profile.

6. The method of claim 5 further comprising: using the user profile to screen new questions for the user.

7. The method of claim 1 further comprising: screening new questions for the user's social connections, using the user profile.

8. An information processing system for deriving a user profile, comprising:
   a memory with computer-executable instructions stored therein, the computer-executable instructions causing a computer to perform:
      generating a user interface on which a user, for whom no profile exists, interacts in a session;
      formulating questions such that a user response to the questions indicates likes and dislikes of the user;
      initially presenting the questions representing topics from different high-level categories to the user on the user interface;
      receiving responses from the user, and the responses indicating user interest from among the different high-level categories;
      iteratively performing the following for each high-level category in which the user expressed an interest:
         selecting a next level of cluster of questions from an increasingly narrowed-down subset of clusters, when one or more responses to questions from a previous level of cluster indicated user interest;
         presenting questions from the selected next level of cluster;
         receiving user responses to the questions; and
         deriving user preferences from the user responses;
      inhibiting at least one cluster, including one or more sub-clusters within the at least one cluster, from consideration for the session when the user indicates no interest in at least one topic associated with the at least one cluster; and
      generating a user profile with the derived user preferences, the user profile including a keyword mapped to a topic that is associated with a first sub-cluster and that the user did not indicate interest in based upon the keyword mapping to a second topic that is associated with a second sub-cluster and that the user did indicate interest in.

9. The information processing system of claim 8 wherein the computer-executable instructions further comprise:
   assigning clusters of questions representing a plurality of topics.

10. The information processing system of claim 9 wherein the computer-executable instructions further comprise, for each cluster: grouping the questions into hierarchical sub-clusters within each cluster, wherein each subsequent level of sub-cluster represents a finer level of granularity in the questions for that sub-cluster.

11. The information processing system of claim 8 wherein no interest is indicated by a negative response or a neutral response from the user.

12. The information processing system of claim 8 wherein the computer-executable instructions further comprise: storing the user profile.

13. The information processing system of claim 12 wherein the computer-executable instructions further comprise: using the user profile to screen new questions for the user.

14. The information processing system of claim 12 wherein the computer-executable instructions further comprise: screening new questions for the user's social connections, using the user profile.

15. A computer program product comprising a non-transitory computer-readable storage medium with computer-executable stored therein, the computer-executable instructions comprising:
   generating a user interface on which a user interacts in a session;
   formulating questions such that a user response to the questions indicates likes and dislikes of the user;
   initially presenting the questions representing topics from different high-level categories to the user on the user interface;
   receiving responses from the user, the responses indicating user interest from among the different high-level categories;
   iteratively performing the following for each high-level category in which the user expressed an interest:
      selecting a next level of cluster of questions from an increasingly narrowed-down subset of clusters, when one or more responses to questions from a previous level of cluster indicated user interest;
      presenting questions from the selected next level of cluster;
      receiving user responses to the questions; and
      deriving user preferences from the user responses;
   inhibiting at least one cluster, including one or more sub-clusters within the at least one cluster, from consideration for generating of one or more user profiles in association with the session when the user indicates no interest in at least one topic associated with the at least one cluster; and
   generating a user profile with the derived user preferences.

16. The computer program product of claim 15 wherein the computer-executable instructions further comprise:
   assigning clusters of questions representing a plurality of topics; and
   for each cluster, grouping the questions into hierarchical sub-clusters within each cluster, wherein each subsequent level of sub-cluster represents a finer level of granularity in the questions for that sub-cluster.

17. The computer program product of claim 15 wherein the user profile includes a keyword mapped to a topic that is associated with a first sub-cluster and that the user did not indicate interest in based upon the keyword mapping to a second topic that is associated with a second sub-cluster and that the user did indicate interest in.

18. The computer program product of claim 17 wherein the computer-executable instructions further comprise: using the user profile to screen new questions for the user.

* * * * *